United States Patent

[11] 3,583,260

| [72] | Inventor | Robert M. Bond<br>873 Shadybrook Drive, Akron, Ohio 44312 |
|---|---|---|
| [21] | Appl. No. | 861,640 |
| [22] | Filed | Sept. 29, 1969 |
| [45] | Patented | June 8, 1971 |

[54] APPARATUS FOR SHARPENING DISC SAWS
9 Claims, 7 Drawing Figs.

| [52] | U.S. Cl. | 76/43 |
|---|---|---|
| [51] | Int. Cl. | B23d 63/12 |
| [50] | Field of Search | 76/42, 43 |

[56]         References Cited
             UNITED STATES PATENTS
1,135,245   4/1915   Zuler........................... 76/42

3,357,278   12/1967   Bond............................ 76/43

*Primary Examiner*—Bernard Stickney
*Attorney*—Oldham and Oldham

ABSTRACT: Apparatus to sharpen disc saws or the like including a driven grinding wheel secured to a base which has an elongate support means pivotally secured at one end to the base to position it beyond the periphery of the grinding wheel. A positioning member or support bar extends longitudinally of said support means for limited axial movement and has a plurality of axially spaced holes therein to receive and position a disc means for rotatably holding a saw disc for movement to and from the grinding wheel for sharpening or other action.

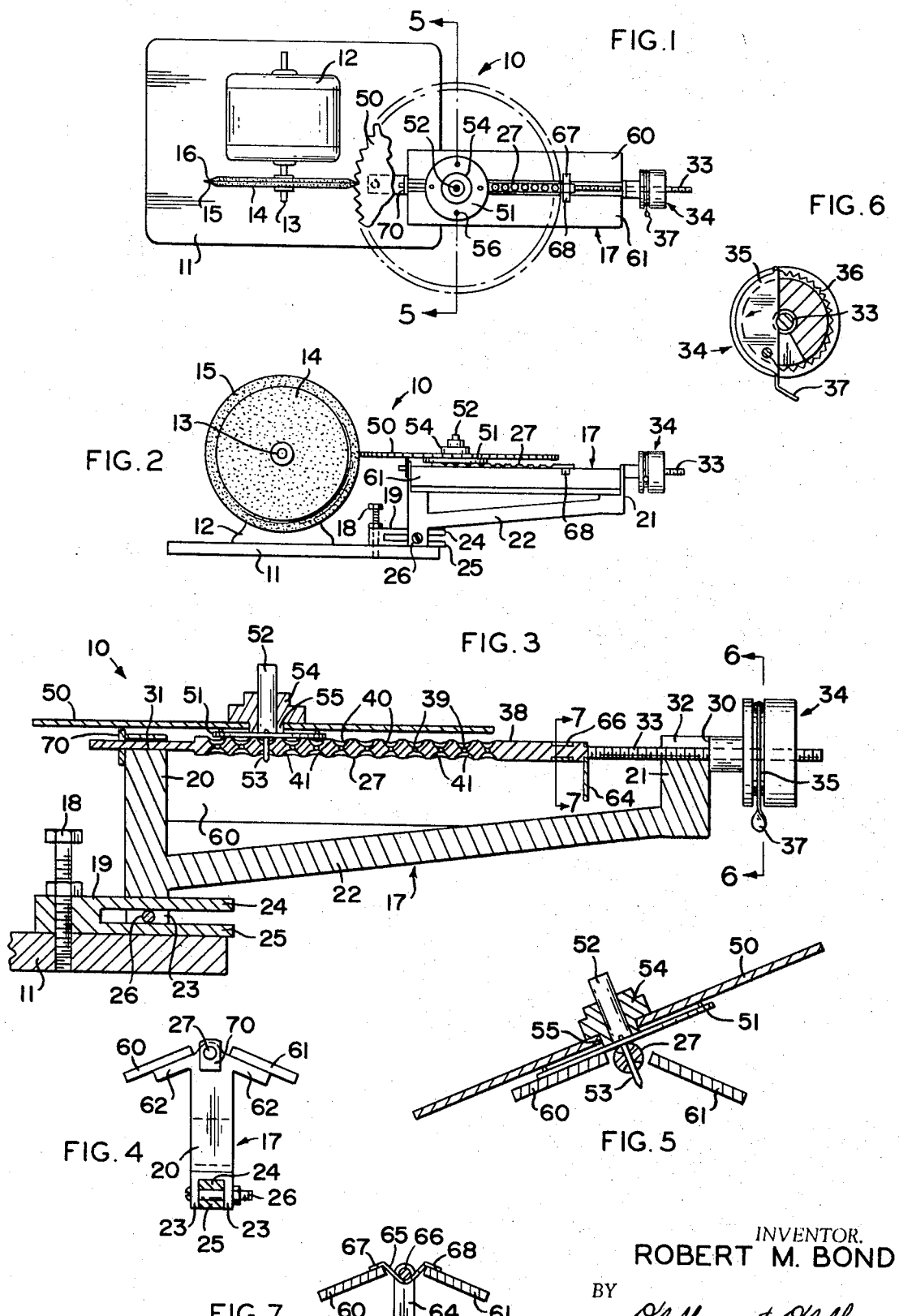

APPARATUS FOR SHARPENING DISC SAWS

This invention relates to an apparatus for sharpening disc saws or the like, by means of a grinding wheel, and more particularly, includes a quickly adjustable guiding and positioning fixture to facilitate and insure an excellent sharpening operation.

BACKGROUND OF INVENTION

Saw sharpeners heretofore known are in most instances too bulky, are not readily adjustable, cannot sharpen disc saws quickly enough to make it profitable for the individual, are not readily portable, and are expensive. One improved sharpener is disclosed in my prior U.S. Pat. No. 3,357,278.

It is the general object of the invention to provide an inexpensive, more efficient, and more practical apparatus to sharpen disc saws, or the like, which apparatus is adapted to position the disc saw to be sharpened in association with a grinder whereby the adjustments on the apparatus of the invention permit the user to quickly, effectively, and efficiently sharpen the teeth of the saw, with precision, with a minimum of effort and time.

It is a further object of the invention to permit a relatively unexperienced person, to sharpen a disc saw because of a novel and readily adjustable guiding fixture or mechanism which permits the disc saw to be positioned and moved accurately in relation to the grinding wheel, to thereby enable the user to do accurate work while sharpening the disc saw teeth, with minimum chance for error.

It is a further object of the invention to provide an improved disc saw positioning and sharpening fixture which permits manual control of the disc saw while limiting movement thereof in the sharpening action.

It is a further object of the invention to provide a disc saw positioning fixture so that the user can retain a saw disc in a horizontal plane and round the saw, or the disc saw can be tilted controlled angles and be moved radially limited distances for tooth sharpening action.

The aforesaid objects of the invention, and other objects which will become apparent as the description proceeds, are achieved by providing an apparatus for sharpening disc saws including a driven beveled edge grinding wheel, support means for the disc saw providing for movement of the periphery of the disc saw into the grinding wheel, said support means including means to hold the saw in a first plane usually including the axis of the grinding wheel or in planes tilted right and left out of the first plane, means for adjustably limiting movement of the saw towards the grinding wheel, means pivotally mounting the support means on an axis substantially at right angles to the axis of the grinding wheel to provide for adjustment of a selected edge of a saw tooth into substantial parallelism or a desired angle with the bevel edge of the grinding wheel, and where the support means include a rod having a plurality of longitudinally spaced holes therein for centering a disc saw thereon, which rod has controlled axially movement in the support means.

For a better understanding of the invention reference should be had to the accompanying drawings, wherein:

FIG. 1 is a plan view of the fixture of the invention in one preferred embodiment thereof;

FIG. 2 is a side elevational view of the fixture of FIG. 1;

FIG. 3 is an enlarged vertical cross-sectional view through the support means of the fixture of FIG. 1;

FIG. 4 is an end elevation of the support means of FIG. 3;

FIG. 5 is an enlarged cross-sectional view taken substantially on line 5–5 of FIG. 1;

FIG. 6 is a vertical section on line 6–6 of FIG. 1; and

FIG. 7 is a vertical section on line 7–7 of FIG. 3.

In the form of the invention illustrated in FIG. 1 of the drawings, a disc saw sharpening fixture of mechanism is indicated as a whole by the numeral 10. A support or base frame 11 is provided in the fixture. A suitable electric motor 12 is fastened to the base 11 and its shaft 13 connects to and drives a suitable grinding wheel 14. A feature of the invention is to place any cover, not shown, over the wheel 14 so as to provide a work area on the left side of the grinding wheel 14 as well as on the right side. This permits the saw disc which is being sharpened, to be placed on the left side of the grinding wheel 12, and even under it, as well as on the right side to thereby facilitate the positioning of the saw teeth in relation to the grinding surface of the grinding wheel so as to grind each tooth to the desired angle. The grinding wheel or disc 14 has included flat grinder surfaces 15 and 16 thereon. This bolt 18 or equivalent means is threadably engaged with a bottom bar 19 of the support means 17 and with the base 11 for vertical adjustment of the support means relative to the grinding disc 14 when desired. Other suitable vertical adjustment means may connect the support means 17 to the base 11.

The support means 17 includes a radially inner end section or post 20 and a radially outer end section or post 21 with any suitable connector link 22 being secured thereto and extending therebetween to form a unit therewith. The posts 20 and 21 are of any suitable design. The post 20 has downwardly extending portions 23 thereon that straddle the bottom bar 19 while such bar has bifurcated vertically spaced arms 24 and 25 thereon. A bolt, or equivalent, 26 extends through the portions 23 and between the arms 24 and 25 so that upon loosening the bolt 26 the support means 17 can be adjusted radially of the grinding disc and be secured in a desired position.

The support arm, or support means 17 as provided in the present invention, includes a positioning bar or rod 27 thereon. Thus, FIG. 3 of the drawings best shows that the vertical end posts or sections 20 and 21 of the support arm 17 include an axially extending hole 31 and guides 32 therein, respectively, and with portions of the positioning bar 27 being operatively engaged therewith for axial sliding movement with relation thereto. The axially outer end of the positioning bar 27 has a threaded section 33 thereon and a quickly releasable control means or member 34, or the like, is engaged therewith. This control means 34 includes a pivotally positioned finger 35 that has a spring engaged therewith. The spring 36 urges the finger 35 toward the threaded section 33 of the positioning bar. The finger 35 is suitably carried by the chuck member or body 34 for pivotal movement perpendicular thereto. By pressing an enlarged end section 37 of the control finger 35 radially inwardly of the control chuck or means 34 the finger is released from engagement with the threaded section 33 of the positioning bar or rod 27. At such time, the control means or body 34 can be moved axially of the threaded section 33 but upon release of the finger 35 from the radially inwardly extending pressure, the finger will again engage the threaded section 33. A flat axially inner end of the control means, 34 indicated at 30, will contact the axially outer end of the end post 21 of the support means, or a member thereon and limit or control the axial position of the positioning bar in relation to the support arm 17. When the control means or body 34 engages such end section, then clockwise rotary movement of the control body on the positioning bar will move such bar axially outwardly of the support arm, as desired. The positioning bar 27 has a thickened section 38 provided therein intermediate the ends thereof, and as an important feature of the invention, this section 38 has a plurality of axially aligned and spaced holes 39 extending therethrough. These holes 39 are flared or beveled outwardly at the opposite ends thereof as indicated at 40 and 41.

In order to position a saw disc 50 in the apparatus for sharpening purposes, a positioning disc 51 is provided which has an engagement or positioning handle 52 thereon and a locating pin or projection 53 extends from such disc. The saw disc 50 is centered with relation to the positioning disc 51 by a locater plug 54 that has an end section 55 thereon sized to engage with the center bore of the saw disc 50. Obviously any of a number of the plugs 54 may be used and be provided with different sized end sections 55 thereon for engaging with the center apertures in saw discs of different diameters and center bore openings. FIG. 3 clearly shows the assembly of the saw disc on the positioning disc 51 with the locator plug 54 aiding in fixedly but rotatably locating the saw disc 50 on its center for arcuate movement about the locater plug and the associated positioning disc 51.

As a further feature of the fixture or mechanism of the invention, a pair of support or guide plates 60 and 61 are suitably secured to the end posts 20 and 21 of the support arm laterally of the longitudinal centerline thereof and they are positioned at downwardly extending acute angles with relation to such support arm axis. Brackets 62 on the end posts may suitably engage and support the guide plates 60 and 61 in position. These support or guide plates 60 and 61 are provided to limit tilting action of the positioning disc 51 and the saw disc positioned thereby with relation to the positioning bar 27. Such angular relationship of the support plates 60 and 61 with relation to the vertical is selected as the maximum angle of tilt required in a saw disc when sharpening the different teeth thereof for best cutting action. It should be noted that this angle of tilt provided for the saw disc 50 as controlled by the support plates 60 and 61 may be correlated with the angle of bevel of the edges 40 and 41 in the positioning bar so that the pointed end or pin 53 of the positioning disc will likewise aid in limiting the angle of tilt of the saw disc and the support plates 60 and 61 prevent any excessive stressing of the pin 53 in the holes 39.

As yet another control member provided in the apparatus, a limiter bar or lug 64 is secured to the positioning bar 27 at the axially outer end of the section 38 provided therein. Such log 64 extends downwardly from the positioner bar and will contact the lower surface of the support plates 60 and/or 61 when maximum tilt of a saw disc is obtained to aid in fixing an adjustable limit of arcuate movement of the positioning bar 27 on its own axis.

As yet another control or positioning member provided in the apparatus, a support spring 65 engages the positioning bar 27 adjacent the axially outer one of the holes 39 provided therein. Such spring 65 is seated in an annular recess 66 in the positioner bar and has downwardly extending end sections 67 and 68 that resiliently engage the support plates 60 and 61 to journal the outer end of the positioning bar 27 and position it above the upper surfaces of the guides 32. Thus the threaded section 33 is protected against wear on axial movement of the positioning bar.

Naturally in use, a combined mechanical and manually controlled positioning action is provided for the saw disc 50 being sharpened. The fixture of the invention aids a person using the fixture 10 in obtaining maximum efficiency in saw sharpening actions. Particularly, the apparatus of the invention can be used for rounding a saw disc when the positioning disc 51 is engaged with a suitable one of the holes 39 and the periphery of the saw disc 50 is brought into engagement with the periphery of the grinder wheel 14 as the saw disc is slowly rotated to true up the circumference and roundness of the saw disc 50 and the individual teeth provided thereon.

When initially positioning a saw disc for sharpening action, the operator would press in upon the finger 35 and slide the control body 34 axially on the positioning bar after he has centered the saw disc by the positioning disc 51 on the positioning bar. Then when the saw disc is substantially in engagement with the periphery of the grinding wheel, he would release the finger 35 and the operator can obtain fine adjustments in the position of the saw disc in relation to the grinding wheel for finalizing the radially innermost grind position of the saw disc in relation to the grinding wheel by radial movement of the control means 34. This relationship will be maintained during any grinding action, but the saw disc can be slid away from the grinding disc by axial movement of the positioning bar 27. After a saw disc has been ground to again be of true circular shape, then the individual teeth can be sharpened on the saw by the operator manually tilting the saw blade in one or the other directions, as desired, and bringing the individual surfaces of the saw disc into engagement with the peripheral portion of the grinding wheel. Such rounding of a disc can be initially obtained and then the control means 34 be reset to limit or determine the radially innermost position of the saw for grinding the bases of the saw teeth to a uniform radius. Naturally, the flat edge surfaces 15 and 16 of the grinding wheel 14 can be formed to any desired planar angular relationship with the vertical plane to facilitate or correspond to those desired for the different surfaces or edges of the individual teeth to be sharpened. If the saw tooth edge is not of a straight line contour, the support arm 17 can be moved arcuately slightly on its support bolt 18 to swing the support arm so that the surface of the saw tooth can be ground along its full length. The positioning bar 27 is free at all times for limited axially outer movement so that the saw disc can be retracted from engagement with the grinding wheel as the individual teeth are sharpened and the saw disc is moved peripherally to bring a new tooth around for engagement with the grinding wheel for sharpening action.

It will be realized that the spring 65 slides on the guide plates 60 and 61 with axial movement of the positioning bar 27.

To facilitate rotation of the disc saw 50 on the positioning disc 51, a number of upwardly extending rounded projections 56 are formed on the disc 51. As the location plug 54 extends down through the disc saw, it aids in retaining the disc saw positioned for sharpening action.

In view of the foregoing, it is believed that a novel and improved grinding fixture or mechanism has been provided to facilitate accurate and rapid sharpening actions on saw discs and similar members. This fixture has a convenient, rapid adjustment of the position of the disc saw, and a plurality of positions for the saw disc are provided to locate the disc saw in substantially its final position before final adjustment by the control means 34. An improved support action is obtained by the mechanism to facilitate its use by an operator for saw sharpening action. The grinding disc normally is maintained in good condition by the tooth sharpening action.

The fixture of the invention enables the operator to joint, or round the disc saw radially while also insuring proper gumming of the saw teeth to uniform depth. Both edges of the teeth can be sharpened so that cuts can be made by the saw that will be burr free. The saws can be used for cutting aluminum.

By placing an edge of one arm of a pair of scissors against the end guide 70, such articles can be sharpened in the fixture of the invention by sliding the arm along the periphery of the grinding disc. Also, pinking shears can be sharpened in a similar manner. The end guide 70 is operatively secured to the post 20 and extends thereabove a short distance to terminate below the position of a disc saw when used for such sharpening action.

What I claim is:

1. Apparatus for sharpening disc saws and other articles including a bevel edge grinding wheel, drive means for said wheel, support means for the disc saw providing for movement of the periphery of the saw into engagement with the grinding wheel, said support means including means to hold the saw in a first plane parallel to the axis of the grinding wheel or in planes tilted right and left on said support means out of the first plane, means pivotally mounting one end of the support means on an axis substantially at right angles to the axis of the grinding wheel to provide for adjustment of the angle of said support means with relation to the plane of the grinding wheel and having the improvement of a support member for a saw disc slidably carried on said support means for limited axial movement, and a releasable screw control means engaging said support member for adjustment thereof longitudinally of said support means.

2. Apparatus as in Claim 1 and including said support member having a plurality of axially spaced vertically extending holes therein, and disc saw positioning means having a projection thereon to be positioned in one of said holes to place a disc saw in the apparatus for sharpening action.

3. Apparatus as in claim 2 which includes the combination of support plates forming a part of said support means, said support plates forming two flat top surfaces angled to each other with both surfaces inclining downwardly from the middle of said supporting means, said support member being positioned at an apex formed by said support plates, and said disc saw positioner means including a positioner pin, said positioner pin being stabbed through a said hole in said support member, said pin thus retaining a saw blade or the like on said support plates, and permitting it to be slidably and rotatably moved in relation to said grinding wheel, said holes being outwardly flared at each end thereof.

4. Apparatus as in claim 1 which includes the combination of said support means having an inner end post and an axially outer end post, said support member being operably positioned for axial sliding movement by said end posts, the axially outer end of said support member being threaded, and spring means positioning the axially outer end of said support member above and out of contact with said outer end post to protect the threads on said support member on axial sliding movement thereof.

5. Apparatus as in claim 4 where said support member includes an annular recess extending around the circumference thereof adjacent the axially inner end of the threads thereon, said spring means comprises a leaf spring seated in said recess and having end portions engaging said support means.

6. Apparatus as in claim 1 where said screw control means include a tubular body slidably engaging said support member and having a radially extending slot formed therein in a portion of its circumference and connecting to the bore thereof, a pivotally positioned lock finger movable into and out of said slot, and spring means urging said finger inwardly to engage said threads on said support member.

7. Apparatus as in claim 6 where said tubular body has a circumferentially positioned annular recess therein, said lock finger and spring means being operatively positioned in said annular recess on said body and said lock finger has an operative position protruding from said recess.

8. Apparatus as in claim 6 where said slot extends into said body over about 180° of the circumference thereof and terminates in a chord intersecting said bore, a pin eccentrically securing said finger in said slot, and a control portion on said finger protruding from said slot at all times and being on the opposite end of said finger as a main body portion thereof which is adapted to engage said support means, said support means being threaded where said tubular body engages the same.

9. Apparatus as in claim 1 where said support means for the disc saw include a positioner disc having a plurality of upwardly extending protuberances thereon by which a disc saw is supported, and a locater plug engaging a center means on said positioner disc and extending through the center hole of a disc saw positioned on said positioner disc to aid in positioning said disc saw for sharpening action.